United States Patent [19]

Melanson et al.

[11] Patent Number: 4,852,214
[45] Date of Patent: Aug. 1, 1989

[54] LINK SEPARATOR GUIDE

[75] Inventors: Leslie B. Melanson, Belmar; Gerald C. Berendt, Seaside Park, both of N.J.

[73] Assignee: Bermel Industries, Inc., Seaside Park, N.J.

[21] Appl. No.: 262,484

[22] Filed: Oct. 25, 1988

[51] Int. Cl.⁴ .......................... A22C 11/00; B26D 5/34
[52] U.S. Cl. .......................................... 17/1 F; 17/49; 83/365; 83/435; 83/436; 83/278
[58] Field of Search ................. 83/365, 438, 440, 444; 17/1 F, 49

[56] References Cited

U.S. PATENT DOCUMENTS

| | | | |
|---|---|---|---|
| 3,646,637 | 3/1972 | Berendt et al. | 17/1 F |
| 3,659,316 | 5/1972 | Berendt et al. | 17/1 F |
| 3,916,763 | 11/1975 | Maroschak | 83/444 |
| 4,060,875 | 12/1977 | Gosling et al. | 17/1 F |
| 4,322,871 | 4/1982 | Townsend et al. | 17/1 F |

Primary Examiner—Donald R. Schran
Attorney, Agent, or Firm—Clifford G. Frayne, Esq.

[57] ABSTRACT

An improved link separator guide for use with a link separator to aid in the alignment and successive positioning of linked material at a severing station, at the joining segment of the linked material, the improved guide having an arcuate channel substantially conforming to a portion of the circumference of the linked material, the guide having recess semicircular indents for the drive rollers of the link separator to cooperate with the arcuate channel in order to partially encapsulate a portion of the circumference of the linked material in order to position the linked material at the severing station.

1 Claim, 2 Drawing Sheets

LINK SEPARATOR GUIDE

FIELD OF INVENTION

The present invention relates to an improved link separator for the manufacture of linked products such as frankfurters, sausages or the like and, in particular, to a feed chute which aids in positioning and alignment of the frankfurther or sausage at a severing knife mechanism.

BACKGROUND OF THE INVENTION

Frankfurters, hot dogs, sausages or like articles are manufactured by forcing a homogenous fluid mass into an elongated casing. The length of the frankfurter or sausage is determined by twisting or tying off the casing periodically along its length creating individual frankfurters, sausages or linked products joined at intermediate joining segments.

It is then customary in the trade to feed long links of frankfurters or sausages into a machine that will automatically sever the links. The machine involved must be capable of avoiding jams and positioning successive frankfurters or sausages in the same position so that the severing mechanism which usually constitutes an automatic knife means, can sever the intermediate joining segments and remove the severed product. Applicant is the holder of U.S. Pat. Nos. 3,646,637 and 3,659,316 for a link separator which has been used in the trade for many years. Applicant's patent directed itself to many of the problems associated with automatically positioning the sausage or frankfurter in position for the severing mechanism. Over the years, applicant has determined that additional improvements were required in order to prevent the bunching up of sausages and hot dogs and to ensure that the intermediate joining segment was positioned for the severing means and not a portion of the frankfurter, sausage or the like.

Applicant's invention comprises a feed chute positioned before the severing mechanism, the feed chute designed to accommodate the cross-sectional diameter of the linked material to be severed, the feed chute aiding and aligning the frankfurter or sausage and preventing the bunching up of the sausages as they approach the severing mechanism and insuring that the severing mechanism is aligned with the joining mechanism and that the linked product is not twisted from the path as a result of the operation of the severing mechanism.

OBJECTS OF THE INVENTION

An object of the present invention is to provide for a new and useful link separator guide which positions a linked product such as a frankfurter, sausage or the like in position to be separated from the preceding linked product, frankfurter, sausage or the like.

It is a still further object of the present invention to provide for a novel and improved link separator guide which prevents the linked product, frankfurter or sausage from being displaced in alignment while being severed.

SUMMARY OF THE INVENTION

An improved link separator guide for positioning a linked product such as a sausage, frankfurter or the like in registration with a severing means, the improved guide comprising a feed trough intersecting two horizontally displaced feed wheels, the circumferential surface of the feed wheels and feed trough designed to partially encapsulate the linked product, the feed trough terminating at a severing means activated by a light sensitive photocell, the separator guide having a transparent post proximate to the knife severing means to prevent the misalignment or displacement of the linked product while not interferring with the light sensitive photocell.

BRIEF DESCRIPTION OF THE DRAWINGS

These and other objects of the present invention would be manifest when taken in consideration with the following drawings wherein.

DETAILED DESCRIPTION OF THE DRAWINGS

Figure 1:
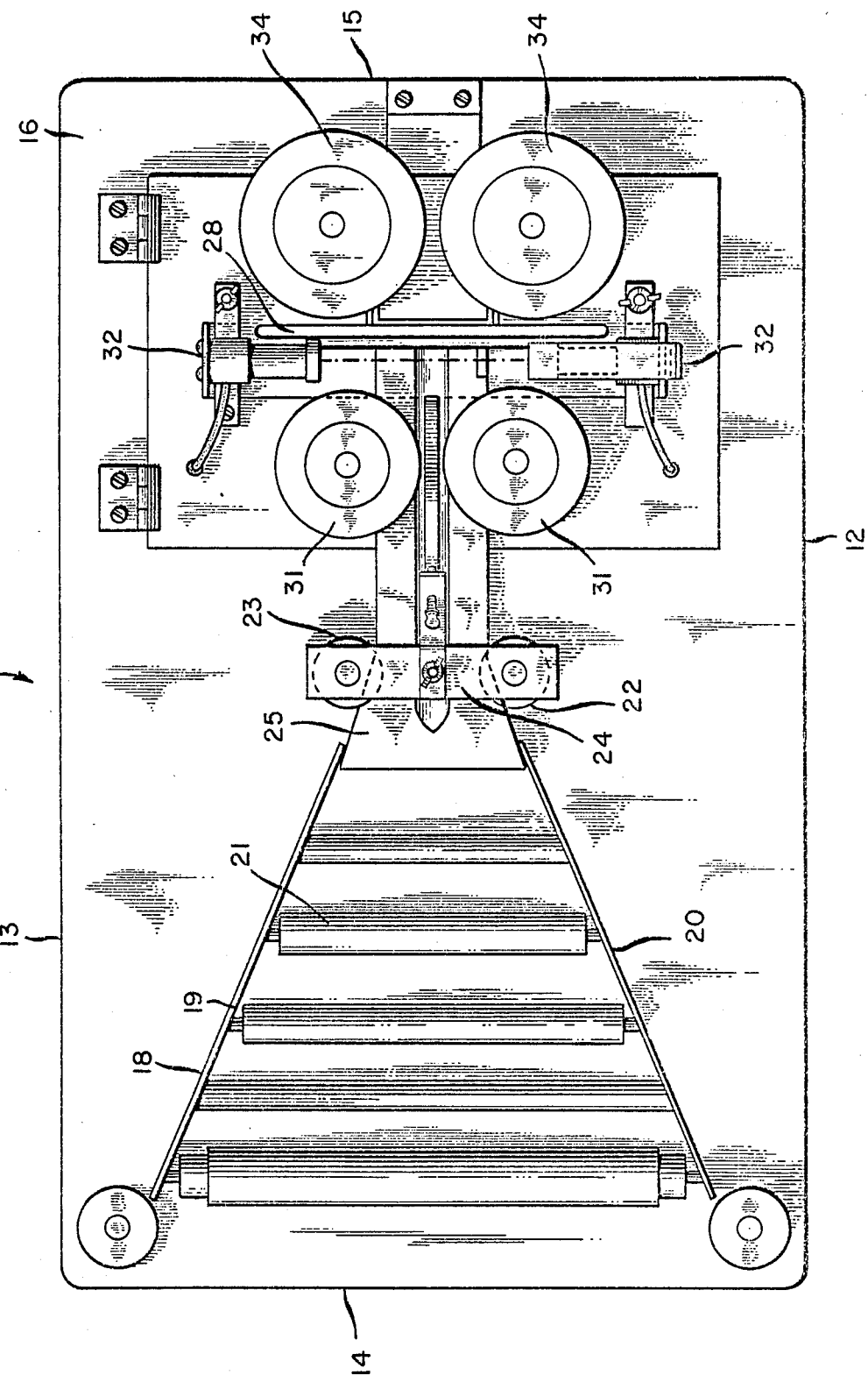
FIG. 1 is a top planer view of a link separating device incorporating the improved link separator guide.
Figure 2:
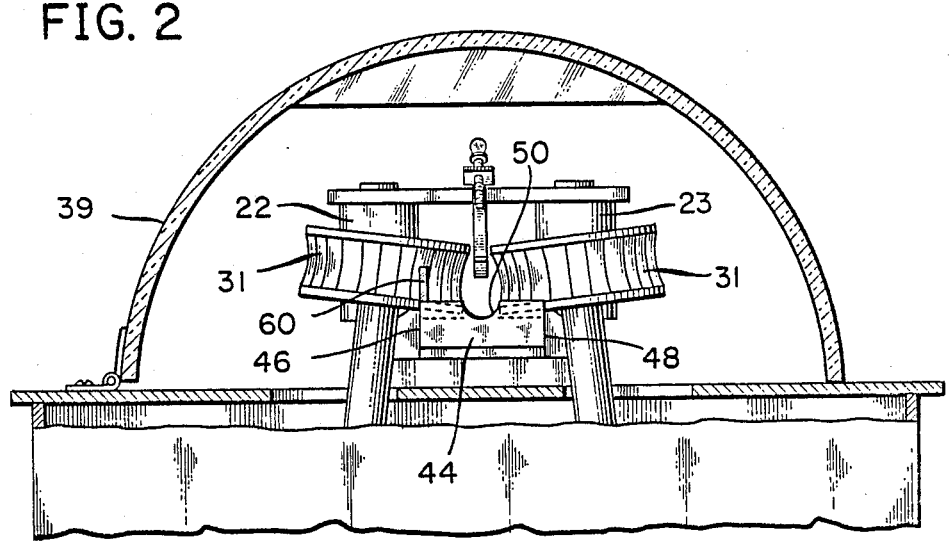
FIG. 2 is an end elevational view of a link separator device incorporating the improved link separator guide.

Referring to the detailed drawings, FIGS. 1 and 2, the link separator is substantially identical as disclosed in applicant's prior patent, U.S. Pat. No. 3,659,316. The link separator comprises a hollow housing 11 defining front and rear walls 12 and 13 respectively and end walls 14 and 15 respectively. There is a flat top platform 16 mounted on housing 11. Applicant's prior invention utilized a guide mechanism 18 comprising a pair of upstanding flanges 19 and 20 which converged in the direction of movement of the linked material, there being disposed between upstanding flanges 19 and 20, a plurality of horizontal guide rollers 21 to aid in the movement of the linked material. Guide rollers 21 were horizontally positioned such that the linked material passed over them en route to the severing station.

Proximate to the converging terminus of upstanding flanges 19 and 20 there was positioned a pair of horizontal guide rollers 23 to aid in directing the linked material toward the severing station. Guide rollers 23 have positioned between them, an elevated platform 24 which supports a spring guide 26 to hold the linked material in a horizontal or flat position as described hereafter. Applicant's link guide 25 is positioned at the convergence of upstanding flanges 19 and 20 and vertical guide rollers 23. Separator guide 25 terminates at a horizontal slit 28 in base 26 which is perpendicular to the path of the linked material. Horizontal slit 28 accommodates the severing mechanism which is activated in accordance with the teachings in U.S. Pat. No. 3,659,316 and rotates about an axis positioned below base 16 such that severing mechanism rotates in a 360° arc up through slit 28 to sever the linked material.

Separator guide 25 is positioned and designed to cooperate with feed rollers 31 to feed the linked material to the severing slit 28. The severing means is activated by a photocell mechanism 32 located at the terminus of link guide 25. A second pair of feed rollers 34 positioned on the opposing side of severing slit 28 serve to transport the severed link material away from the severing means. These outgoing feed rollers 34 are rotating faster than the incoming feed rollers 31. This is to facilitate a stretch of product at the joined segment so as to have a wider gap for the knife mechanism to sever the two links apart.

As shown in FIG. 2, a hingeable safety shield 39 positioned over slit 28 and the severing means to prevent an insertion by the operator's hand when the machine is operating.

Figure 5:
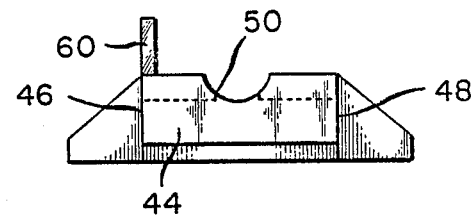
FIG. 5 is an end elevational view of the link separator guide in cooperation with the drive wheels.
Figure 4:
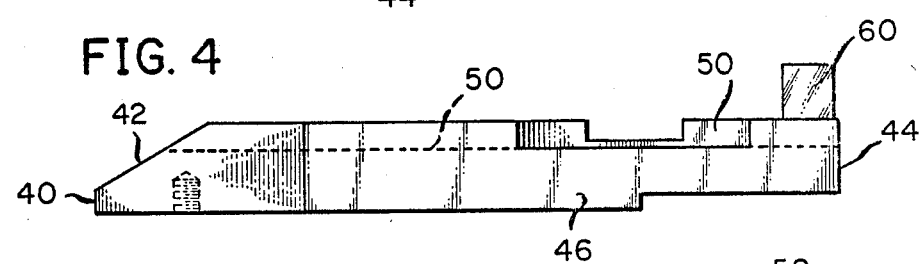
FIG. 4 is a side elevational view of the improved link separator guide.
Figure 3:
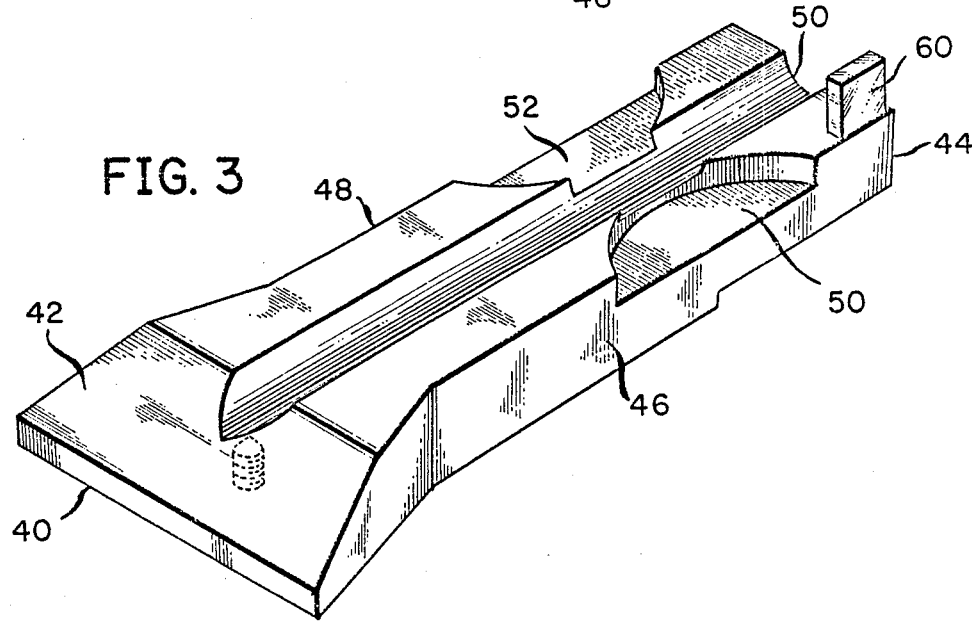
FIG. 3 is a perspective view of the link separator guide.

A better understanding of the link separator guide 25 can be had with reference to FIG. 3 which is a perspective view of the link separator guide 25 and FIGS. 4 and 5 which are a side and end elevational view. The guide comprises a first end 40 having an angled slope 42 so as not to cause jamming of the linked material fed into the link separator. Second end 44 which terminates proximate to severing slit 28 is substantially vertical as are sidewalls 46 and 48. Disposed between first end 40 and second end 44, is a trough 50 which is circular to conform to the partial circumference of the linked material. Positioned proximate to second end 44 are two opposing semi-circular indents 50 and 52 designed to allow feed rollers 31 to be positioned such that they rotate within circular indents 50 and 52. See FIG. 2. Circular feed rollers 31 are concave on their circumferential edge 37 such that they cooperate with feed trough 50 to partially encapsulate the linked material as it passes through.

Positioned adjacent second end 44 is a transparent post 60. Transparent post 60 is transparent in order to permit the operation of the photocell and light source mechanism 40, the alignment of which is proximate to second end 44 of separator guide 25. Transparent post 60 also prevents the possible displacement of misalignment of the linked material during the operation of severing means and cooperates with trough 50 to disallow any inadvertent light to be shown under the product so as not to misfire the knife mechanism.

The operation of the link separator is similar to that of the link separator disclosed in applicant's U.S. Pat. No. 3,659,316 with the advantages of the improved link separator guide best being understood by following the path of linked sausage material.

In normal operation, several hundred linked sausage or linked hot dogs or the like, are normally positioned on a platform proximate to end 14 of link separator 11. The linked material to be severed is pulled to position between feed rollers 31 by hand, and then protective shield 39 would then be positioned in its closed position and the machine would be activated. Feed rollers 31 would send the first linked material past the photocell 32 until the joining segment with the second linked material was in alignment with the photocell. This would permit the photocell light beam to pass thus activating the severing means in accordance with the teachings of U.S. Pat. No. 3,659,316. The first linked material would already have become engaged with outgoing feed rollers 34 which rotate faster than feed rollers 31 to cause a slight stretching between the linked material and the first linked material would exit the link separator to a collecting means. Simultaneously, the second linked material would pass across the photocell path positioning the second joining segment in line with slit 28, again repeating the process. In this configuration, the linked material is pulled from its storage space proximate to end 14 of link separator 11, over guide rollers 21 and through feed rollers 31 and exit feed rollers 34.

Trough 50 in link separator guide 25 cooperates with the concave circumferential sidewall 37 of feed rollers 31 together with leaf spring 26 to align the linked material proximate to the photocell 32 and slit 28 so that there is no misfiring of the severing means such that it would cut the inked material itself as opposed to the joining segment. Since in the manufacture of linked material such as hot dogs, sausages and the like, the opposing ends of the linked material oftentime deform to an arcuate shape, the trough 50 of link separator guide 50 in combination with the arcuate sidewalls of feed rollers 31 and leaf spring 26 serve to straighten out this arcuate tendency of the linked material for the purpose of introducing the linked material and joining segments to the severing means.

The operation of the severing mechanism in conjunction with the photocell 32 is operationally identical to that disclosed in U.S. Pat. No. 3,659,316. The improved link separator guide disclosed herein serves to reduce the jamming of the linked material and decreases the possibility of possible misfires of the severing means.

While the above matter describes and illustrates the preferred embodiment of the invention, it should be understood that the invention is not restricted solely to the described embodiments, but that it covers all modifications which should be apparent to one skilled in the art which would fall within the scope and spirit of the invention.

We claim:

1. An improved link separator which is comprised of a means for drive feeding to a severing station a chain of articles joined together by joining segments, a photocell and opposed light source proximate to the severing station, a radial knife positioned at the severing station and rotatable in a plane generally perpendicular to and extending through said joining segments, a drive means for the knife, a control means for the drive means activated in response to a signal from the photocell, the control means generating a rotation of said knife for each joining segment, a means for drive discharging severed articles from the severing station, a means for governing the vertical position of the articles proximate to the severing station including a lower support and an upper vertically opposed finger and support said chain of articles must pass, the improvement therein comprising:

an elongated link separator guide extending from said drive feed to said severing station, said guide having formed on the top thereof, and a longitudinal arcuate channel conforming substantially to a portion of the circumference of the chain of articles, said longitudinal arcuate channel passing between said drive feed and cooperating with said drive feed to partially encapsulate a portion of the circumference of the chain of articles and to position said joining segment of said chain of articles in alignment with said severing station, said link separator guide comprising a first end and a second end, said first end being inclined to permit the successive positioning of chain link articles in said arcuate channel, said second end terminating proximate to said severing station, said second end having an upstanding transparent post for additional alignment of said chain of articles, said transparent post permitting the passage of said light beam from said light source to said photocell, said drive feeding means being positioned between said first end and said second end of said improved link separator guide, said drive feeding means being positioned in juxtaposed semi-circular indents intersecting said arcuate channel.

* * * * *